US011919176B2

United States Patent
Halvorsen et al.

(10) Patent No.: US 11,919,176 B2
(45) Date of Patent: Mar. 5, 2024

(54) MOBILE CONSTRUCTION ROBOT

(71) Applicant: Hilti Aktiengesellschaft, Schaan (LI)

(72) Inventors: Håvard Halvorsen, Sogndal (NO); Jørn Sandvik Nilsson, Sogndal (NO)

(73) Assignee: Hilti Aktiengesellschaft, Schaan (LI)

( * ) Notice: Subject to any disclaimer, the term of this patent is extended or adjusted under 35 U.S.C. 154(b) by 464 days.

(21) Appl. No.: 17/269,241

(22) PCT Filed: Aug. 13, 2019

(86) PCT No.: PCT/EP2019/071734
§ 371 (c)(1),
(2) Date: Feb. 17, 2021

(87) PCT Pub. No.: WO2020/038779
PCT Pub. Date: Feb. 27, 2020

(65) Prior Publication Data
US 2021/0323163 A1    Oct. 21, 2021

(30) Foreign Application Priority Data

Aug. 22, 2018  (EP) ..................................... 18190211

(51) Int. Cl.
 B25J 9/16  (2006.01)
 B25J 11/00  (2006.01)
 (Continued)

(52) U.S. Cl.
 CPC ............. B25J 9/1692 (2013.01); B25J 9/162 (2013.01); B25J 11/005 (2013.01); B25J 13/089 (2013.01);
 (Continued)

(58) Field of Classification Search
 CPC ........ B25J 9/1692; B25J 9/162; B25J 11/005; B25J 13/089; G05B 19/401;
 (Continued)

(56) References Cited

U.S. PATENT DOCUMENTS

2012/0298640 A1  11/2012  Conrardy et al.
2013/0006421 A1  1/2013  Brogardh
(Continued)

FOREIGN PATENT DOCUMENTS

| CN | 107543495 A | 1/2018 |
|---|---|---|
| EP | 2 407 282 A2 | 1/2012 |
| WO | WO 2016/066615 A2 | 5/2016 |

OTHER PUBLICATIONS

PCT/EP2019/071734, International Search Report dated Nov. 15, 2019 (Two (2) pages).

*Primary Examiner* — Abby Y Lin
*Assistant Examiner* — Dylan M Katz
(74) *Attorney, Agent, or Firm* — Crowell & Moring LLP

(57) ABSTRACT

A method of operating a mobile construction robot includes placing an optical tracker on an architectural construction site and parking a driving platform of the robot on the site. An end effector of the robot is moved in first and second positions and the first and second positions of the end effector relative to the driving platform are measured. An optical marker mounted to the end effector is tracked in the first and second positions of the end effector with the optical tracker and the first and second positions of the optical marker relative to the optical tracker is measured with the optical tracker. A position and an orientation of the driving platform is determined based on the measured first and second position of the end effector relative to the driving platform and the measured first and second position of the optical marker relative to the optical tracker.

2 Claims, 2 Drawing Sheets

(51) Int. Cl.
*B25J 13/08* (2006.01)
*G05B 19/401* (2006.01)

(52) U.S. Cl.
CPC .. *G05B 19/401* (2013.01); *G05B 2219/39017* (2013.01); *G05B 2219/39024* (2013.01); *G05B 2219/39033* (2013.01); *G05B 2219/39047* (2013.01)

(58) Field of Classification Search
CPC .......... G05B 2219/39017; G05B 2219/39024; G05B 2219/39033; G05B 2219/39047; G05B 19/404; B25F 5/00; B25H 1/0035
See application file for complete search history.

(56) References Cited

U.S. PATENT DOCUMENTS

| | | | |
|---|---|---|---|
| 2018/0283019 A1 | 10/2018 | Telleria et al. | |
| 2018/0326507 A1 | 11/2018 | Halvorsen et al. | |
| 2019/0224846 A1* | 7/2019 | Pivac | B25J 9/1664 |
| 2020/0346350 A1* | 11/2020 | Keselman | G06T 19/006 |

* cited by examiner

MOBILE CONSTRUCTION ROBOT

CROSS REFERENCE TO RELATED APPLICATIONS

This application claims the priority of International Application No. PCT/EP2019/071734, filed Aug. 13, 2019, and European Patent Document No. 18190211.5, filed Aug. 22, 2018, the disclosures of which are expressly incorporated by reference herein.

BACKGROUND AND SUMMARY OF THE INVENTION

The present invention relates to a mobile construction robot for machining or finishing an architectural construction site, as well as to a method of operating using the mobile construction robot.

A mobile construction robot is known form WO 2016/066615. The robot is designed for drilling holes in ceilings and walls. A drilling machine is mounted to a robotic arm. The robotic arm stands on a vertical lift and a driving platform. A user can drive the robot by means of the driving platform to an area where holes are to be drilled. The robot may access and retrieve BIM files to allow it to determine where to the position the drilling machine by means of the robotic arm.

The robot can calculate its position and orientation based on inputs from a laser total station. The total laser station may be provided in the vicinity of the robot on the construction site floor. The robot has a reflector prism on each side. An advantage of this method is that an accuracy within the limits of the total station can be achieved. However, the total station needs to measure the position of both prisms after the robot has reached its drilling position and is stationary.

A faster but significantly less accurate method is based on a single reflector prism and a total station in addition to visible laser line parallel to a drill line. The user has to manually align the visible laser line.

The invention provides a determination of position and orientation of a mobile construction robot using an optical tracker and a single optical marker. The system achieves a resolution limited by the optical tracker.

A method of operating the mobile construction robot is based on: Placing an optical tracker on the architectural construction site. Parking a driving platform of the mobile construction robot in an area of the architectural construction site. Moving an end effector of the mobile construction robot in at least a first position and a second position by controlling a robotic arm mounted on the driving platform. Measuring the at least first position and second position relative to the driving platform using sensors mounted on the robotic arm. Tracking an optical marker mounted to end effector in the at least first position and second position of the end effector with the optical tracker. Measuring the at least first position and second position of the optical marker relative to the optical tracker with the optical tracker. And, determining position and orientation of the driving platform based on the at least first position and second position of the end effector measured relative to the driving platform and the at least first position and second position of the optical marker measured relative to the optical tracker.

An initial alignment of the optical tracker towards the optical marker may be needed only once. Afterwards, the optical tracker can follow the movement from the first position to the second position. Determining position and orientation of the driving platform can be performed faster than tracking two separate optical markers but without sacrificing on accuracy.

Certain preferred embodiments of the present invention will be described in greater detail by way of example only and with reference to the accompanying Figures.

DETAILED DESCRIPTION OF THE DRAWINGS

Figure 1:
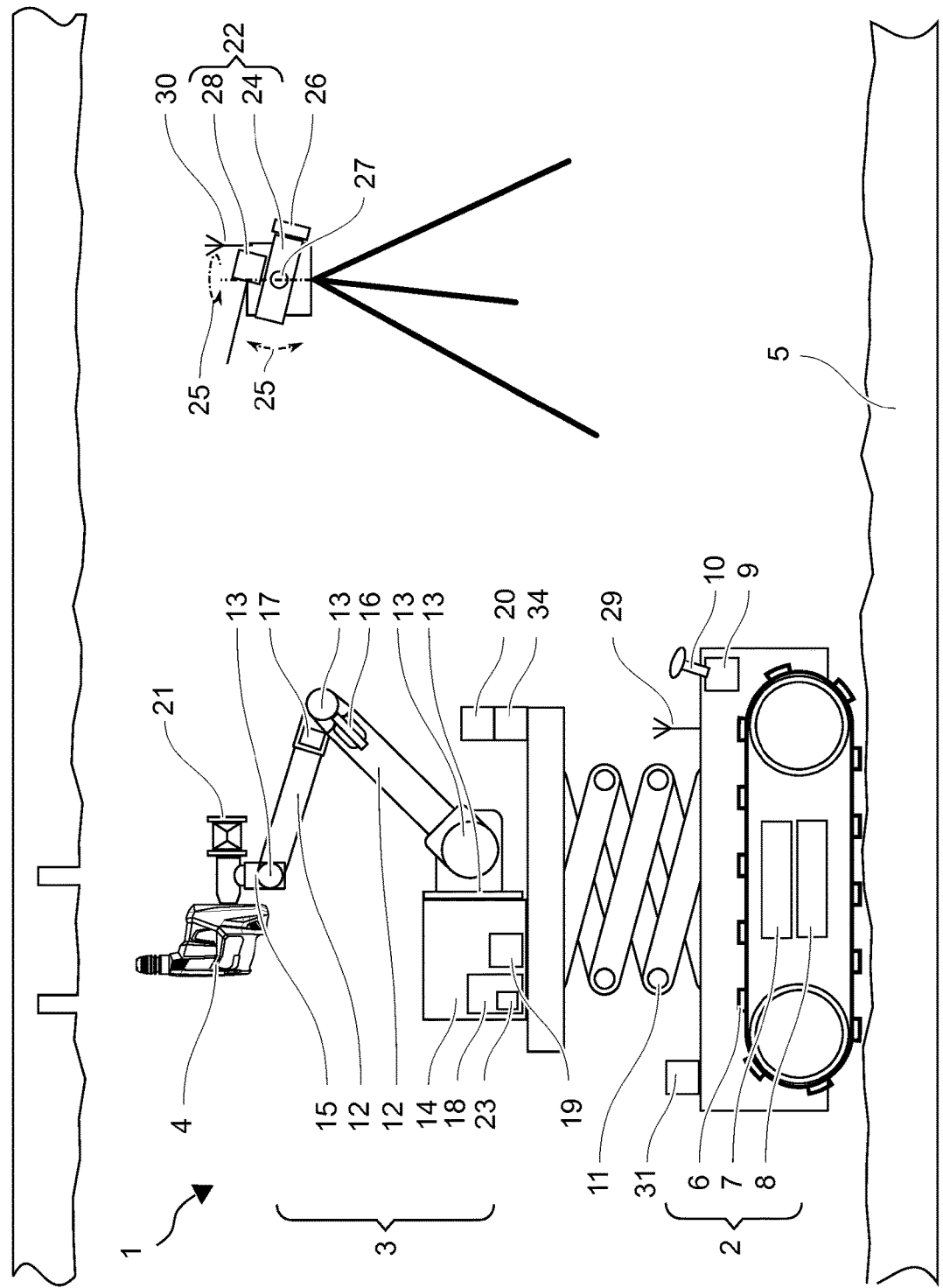
FIG. 1 illustrates a mobile construction robot.

One aspect of an embodiment of the present invention is shown generally in FIG. 1.

In this embodiment, there is provided a mobile construction robot 1 having a driving platform 2, a robotic arm 3 mounted to the driving platform 2 and an effector 3 mounted to the robotic arm 3, the effector 4 being adapted for machining or finishing an architectural construction site 5.

The driving platform 2 is illustrated by way of example. The driving platform 2 is adapted to stand stably and drive on the floor of an architectural construction site 5. The driving platform 2 may comprise a continuous track 6 or several wheels to stand on the floor. A motor 7, e.g., an electric motor, is coupled to the continuous track 6 or wheels. The motor 7 may be powered by battery pack 8 which is carried on the driving platform 2. A driving control unit (DCU) 9 controls the movement of the driving platform 2. The DCU 9 may comprise a user interface 10, e.g., a steering wheel, a joystick, an input screen, a keyboard, a tablet, a computer. The user interface 10 can be mounted to the driving platform 2 or be detachable from the driving platform 2. The user can instruct the driving platform 2 to move to a working position by indicating directions, like move straight, turn by a certain angle. Further, the user can instruct the driving platform 2 to semi-automatically or automatically drive to a working position by indicating coordinates of the position.

The illustrated mobile construction robot 1 comprises a vertical lift structure 11. The optional lift structure 11 is mounted on driving platform 2 and supports the robotic arm 3. The robotic arm 3 may be lifted vertically, i.e., against gravity, by the lift structure 11. The lift structure 11 can be a scissor-lift or a telescopic pillar.

FIG. 1 shows an embodiment of the robotic arm 3, in particular a six-axis, articulated robotic arm 3. The robotic arm 3 comprises several arm segments 12 and rotary joints 13. A first of the arm segments 12 forms a mount base 14 mounted to the driving platform 2, a last of the arm segments 15 carries the effector 4. The arm segments 12 are interconnected by the rotary joints 13. Thus, the arm segments 12 can pivot and/or rotate with respect to each other. Pivoting and rotating allows different postures of the robotic arm 3. The effector 4 can be maneuvered about a number of axis into an intended position and intended orientation.

The rotary joints 13 are equipped with a rotary drive 16. The rotary drive 16 is preferable integrated in the rotary joint 13 or one of the arm segment 12 connected to the rotary joint 13. The rotary drive 16 can rotate the one arm segment 12 connected to the rotary joint 13 with respect to the other arm segment 12 connected to the rotary joint 13. The rotary drive 16 can be an electric motor. A rotary sensor 17 measures the (joint) angle at the rotary joint 13 between the arm segments 12. The rotary sensor 17 may be integrated in the rotary drive 16, e.g., the rotary drive is a step motor 7. Further, the rotary sensor 17 can be a rotary encoder attached to or integrated in the rotary joint 13. A robotic control unit 18 controls all rotary joints 13 and its respective rotary drives 16 based on a kinematic model of the robotic arm 3. The kinematic model maps a position and orientation of the end effector 4 to corresponding joint angles for each of the rotary joints 13. The RCU 18 drives 16 the rotary joints 13 into the joint angles such the effector 4 is positioned and orientated as intended. A feedback-loop of the rotary sensors 17 and the RCU 18 while driving the rotary drives 16 may enhance accuracy and repeatability of the robotic arm 3. The RCU 18 can actively determine position and orientation of the effector 4 by inquiring the joint angles from the rotary sensors 17. Or the RCU 18 can store the actual position and orientation of the effector 4 in a memory bank 19 after each movement.

The robotic control unit 18 preferably references position and orientation of the end effector 4 to its mount base 14. The mount base 14 can be defined as origin in the coordinate system of the robotic control unit (RCU) 18. Precision and repeatability of position and orientation of the end effector 4 are mainly limited by the rotary sensors 17 and the rotary drives 16.

The robotic control unit 18 includes a calibration unit 20. The calibration unit 20 references the coordinate system of the RCU 18 to a coordinate system of the construction site 5. The calibration unit 20 includes an optical marker 21 attached to the end effector 4 and an optical tracker 22 stationary placed on the construction site 5. The calibration routine can be processed by a dedicated calibration processor 23.

The optical marker 21 is preferably a reflective prism.

The optical tracker 22 can be a theodolite, laser total station, tacheometer. A tacheometer has a telescope 24 mounted swingable about two different, typically orthogonal, axes 25. The optical tracker 22 automatically aligns the telescope 24 onto the optical marker 21. The telescope 24 projects an image of the optical marker 21 onto a photoelement with spatial resolution, e.g., a ccd-element. A processing unit of the telescope 24 swings the telescope 24 such that optical marker 21 or a beam reflected by the optical marker 21 falls onto centre point of the photoelement 26. The angles of telescope 24 about the two axes 25 are measured by high precision angular encoders 27, typically with a precision in the range of a milliradian. The tacheometer further includes an optical distance measuring device 28 which measures the distance to the optical marker 21 to which the telescope is oriented towards. The optical distance measuring device 28 typically emits a laser light beam and detects a reflection of the emitted laser light beam. The distance is determined based on a time of flight measurement of the reflection. The precision of the time of flight measurement can be enhanced with an interferometric setup and/or with modulations of the emitted light beam. The optical marker's 21 position with respect to the optical tracker 22 is determined by measuring the two angles and distance. A user installs the optical tracker 22 on the site 5. The instalment may include calibrating the optical tracker 22 with respect to some reference points of the construction site 5. Typically, the instalment is a labor-intensive action. Once installed, the optical tracker 22 can remain in position even though the robot 1 is driven to new locations as long the locations are in sight from by the optical tracker 22.

The calibration processor 23 has a communication interface 29 for communicating with the optical tracker 22 and a communication interface 30 for communicating with the robotic control unit 18. The communication interfaces 29, 30 can be implemented as wired connections or wire-less connections. Communication protocols can be based on established communication protocols like WiFi, Bluetooth, etc.

An embodiment of the calibration routine is explained with reference to FIG. 2.

The driving platform 2 is parked at a location on the construction site 5. The user may have manually steered the driving platform 2 to the location. The vertical lift structure 11 may be raised to a height, for instance manually by the user. For now, the vertical lift structure 11 remains at the height. Hence, the mount base 14 of the robotic arm 3 is immobile with respect to the construction site 5 and stays immobile throughout processing of the calibration routine. The coordinate system of the robotic arm 3 is immobile versus the coordinate system of the construction site 5.

The robotic arm 3 has been left in a posture by its last action. For instance, the posture may be a parking posture. The robotic arm 3 is moved into the parking posture while the driving platform 2 is moving. The robotic arm 3 and effector 4 are preferably protected against collisions with the environment. For instance, the robotic arm 3 does not laterally extend beyond the driving platform 2 and the effector 4 is lowered closest to the driving platform 2. Another action may be drilling of a ceiling. The end effector 4 is raised to the ceiling and orientated perpendicular to the ceiling.

The calibration routine may be initiated in response to a user input on the user interface 10. Alternatively or additionally, the calibration processor 23 may survey movements of the driving platform 2. The calibration processor 23 is triggered when the driving platform 2 stops. For instance, the DCU 9 provides a stop signal when the driving platform 2 changes from moving to standing. Further, the stop signal may be obtained by movement sensors 31 of any kind which are connected to the calibration processor 23.

The robotic arm 3 may stay in the posture used for the last action. The position and orientation of the end effector 4 is determined by the RCU 18. The position and orientation can be inquired by the calibration processor 23 from the RCU 18 by reading out the rotary sensors 17 of the robotic arm 3 or by reading out the memory bank 19 containing the position and orientation of the last movement. The actual posture may be used as first posture P1. The present position is the first position and orientation of the end effector 4 in reference to the driving platform 2.

Figure 3:
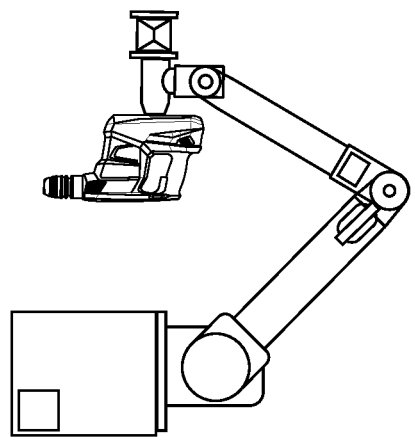
FIG. 3 illustrates the first position in a side view.

The robotic arm 3 may be moved into a predefined first posture P1 to have the end effector 4 in a first position and with a first orientation. FIG. 3 illustrates the first posture P1 by example. The end effector 4 is held such that the optical marker 21 is above any structure of the robotic arm 3. The optical marker 21 is in clear sight for the optical tracker 22, at least the optical marker 21 is not hidden behind the robotic arm 3. Another embodiment may have a set of dedicated postures. The robotic arm 3 moves into a posture which has most likely an unobstructed line of view to the optical tracker 22. The embodiment will be explained in a later paragraph. The first position and first orientation of the end effector 4 is inquired by the calibration processor 23 from the RCU 18.

The calibration processor 23 determines if the robotic arm 3 has reached the first posture P1. If so, the calibration processor 23 triggers the optical tracker 22 to measure the position a1 of the optical marker 21. The optical tracker 22 searches for the optical marker 21 by scanning the hemisphere defined by both its axes 25. In an embodiment, the calibration processor 23 can indicate a sector of the hemisphere where the optical marker 21 is to be found. The embodiment will be described in a later paragraph.

The optical tracker 22 submits the measured position a1 of the optical marker 21 to the calibration processor 23. The position a1 is referenced with respect to the optical tracker 22, which by itself is preferably referenced to the construction site 5. The position a1 may be expressed in spherical coordinates, e.g., two angles and a distance, in three-dimensional Cartesian coordinates. The submitted position a1 does not contain information about the orientation of the optical marker 21 with respect to the optical tracker 22 or any other reference system.

The calibration processor 23 references the submitted position a1 with the first posture P1. A shift vector indicating the vector form the origin of the optical tracker's coordinate system C2 to the origin of the robotic coordinate system C1 can be determined. The shift vector Vs can be the difference of the position vector a1 as measured by the optical tracker 22 and the position vector as measured by the RCU 18.

Figure 2:
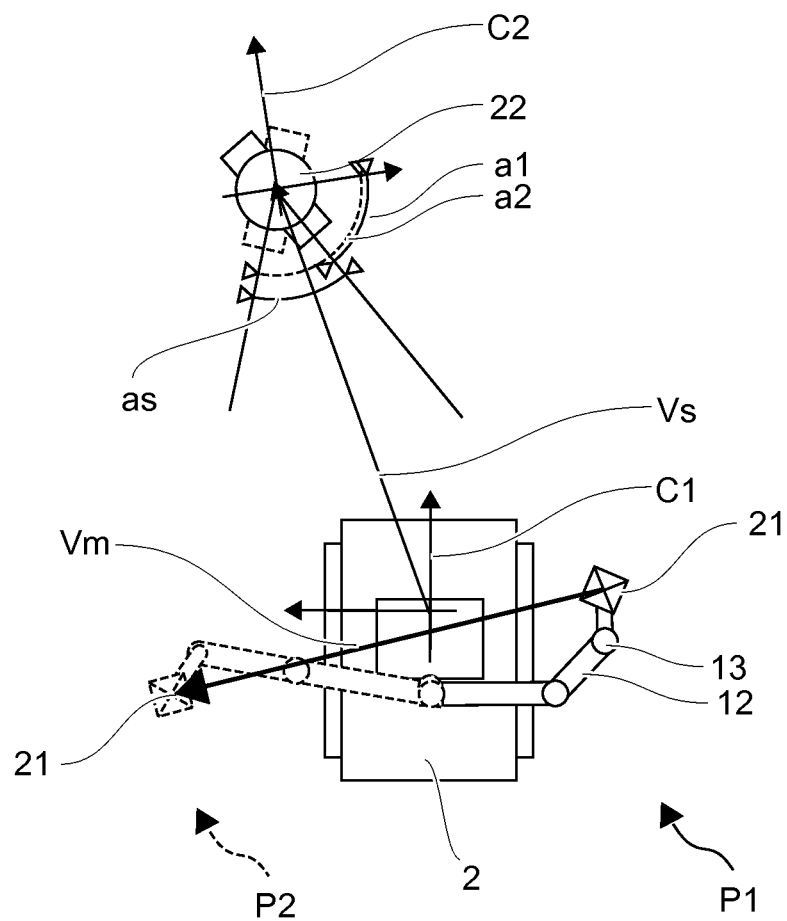
FIG. 2 is a schematic top view of the robot.

After the optical tracker 22 has submitted the position, the calibration processor 23 instructs the RCU 18 to move the robotic arm 3 into a second posture P2 (dotted lines in FIG. 2). The end effector 4 is shifted, at least partly, horizontally from the first posture P1 to the second posture P2. The movement vector Vm may have a horizontal component, only.

The calibration processor 23 instructs the optical tracker 22 to track the movement of the optical marker 21. Preferably, the optical tracker 22 is instructed to track before the robotic arm 3 starts moving. The movement of the optical marker 21 leads to a shift of its image in the optical tracker 22. The tracking mode of the optical tracker 22 realigns the telescope 24 based on a feedback-loop to compensate for the shift in the image of optical marker 21. The optical tracker 22 does not measure the position of the optical marker 21 while tracking. A higher tracking speed may be achieved which allows for a faster movement of the robotic arm 3.

Once the robotic arm 3 has reached the second posture P2, the second position and second orientation of the end effector 4 are inquired by the calibration processor 23 from the RCU 18. And, the calibration processor 23 instructs the optical tracker 22 to measure the position a2 of the optical marker 21 in the second posture P2. The optical tracker 22 submits the measured position a2 to the calibration processor 23. The calibration processor 23 evaluates a rotation of the robotic coordinate system C1 with respect to the optical tracker's coordinate system C2. The rotation can be determined based on the movement vector Vm as measured by the RCU 18, the movement vector Vm as measured by the optical tracker 22 and the shift vector Vs. The movement vector Vm is the difference of the position in the first posture P1 and the position in the second posture P2.

The second posture P2 may be a single predefined posture. However, preferably the calibration processor 23 determines the second posture P2 based on accuracy of a calibration result. The accuracy typically increases with a larger swing angle as of the optical tracker 22 in the horizontal plane from the first posture P1 to the second posture P2. The swing angle as is equivalent to the difference of the positions measured in the first posture P1 and second posture P2. The swing angle as depends on the length of the movement vector Vm and the orientation of the movement vector Vm relative to a line from the optical tracker 22 to the optical marker 21 or robot 1. The line corresponds with the shift vector Vs in the illustrated example. The length of the movement vector Vm is limited by the length of the robotic arm 3 and can further be constraint by the environment. The relative orientation of the movement vector Vm and the shift vector Vs has a high impact on the resolution. Preferably, the relative orientation is close to a perpendicular orientation.

A variation of the above embodiment increases the accuracy by adaptation of the second posture P2. The calibration routine determines angle between the movement vector Vs and the line of sight from the mount base 14 to the optical tracker 22. If the angle is smaller than a threshold the calibration routine determines a corrected second posture. The corrected second posture is determined such that the movement vector Vs from the first posture P1 to the corrected second posture is perpendicular or nearly perpendicular to the line of sight. The threshold is preferably an angle of at least 60 degrees.

The above description considered that the robot 1 is standing upright. The robot 1 may be standing on an inclined ground or the robot 1. The inclination may be determined by electronic inclinometers 34 mounted on the robot 1. Such inclinometers may be constructed as gyroscopes, microelectromechanical systems, etc. The inclination may be processed by the RCU 18 and taken into consideration for the above calibration.

The inclination may be confirmed by a measurement using the optical marker 21 and the optical tracker 22. The optical marker 21 is moved into a third position. There is geometric constraint on the third position otherwise a measurement using the third position will gain no new information. The angle as between the first position a1 and second position a2 is measured in a first plane, e.g., in a horizontal plane. The third position is displaced with respect to the plane, e.g., shifted vertically. Thus, an angle between the first position and the third position is measured in further plane non-parallel to the previous plane.

The optical marker 21 may be moved to further positions. The accuracy of the calibration may be increased by moving the optical marker 21 to several different positions and tracking the positions with optical tracker 22. In particular measurement noise may be suppressed.

Typically, a search of optical marker 21 by the optical tracker 22 requires a significant amount of time because the optical tracker 22 scans the full hemisphere around its location until the optical marker 21 is found. In an embodiment, the calibration routine seeks to limit the search to a sector of the hemisphere based on previous calibrations. The robot 1 is repeatedly relocated on the construction site 5 using the driving platform 2. The driving platform 2 registers the movement from the previous location to the present location. For instance, the driving platform 2 can register time, speed, distance, steer angle, turns, etc. by sensors mounted on the driving platform 2, like speedometer, tachometer, accelerometer. The calibration routine estimates a vector from the robot 1 to the optical tracker 22 based on the previous shift vector Vs and the movement registered by the driving platform 2. Further, the calibration routine may estimate a confidence range around the vector Vs in which the optical marker 21 is likely to be found. The confidence range may take into account the length of the vector Vs and/or the distance moved by driving platform 2. The calibration processor 23 transmits the vector Vs and confidence range to the optical tracker 22 such to search the optical marker 21 within the confidence range.

The optical tracker 22 may not be able to track the optical marker 21 while moving. A reason, in particular for reflective prisms, is that the optical marker 21 may turn away from the optical tracker 22 even though moved along a straight line. In a further embodiment, the RCU 18 estimates the direction towards the optical tracker 22 based on previous calibrations. The RCU 18 may reuse the calibration made at a previous location. Movement sensors on the driving platform 2 measure the movement from the previous location to the present location. The accuracy of the estimate may be only accurate to a few degrees. However, this is sufficient for avoiding a loss of tracking of the optical marker 21. While the optical marker 21 is in the first position a2 the end effector 4 is rotated such that the optical marker 21 points towards the optical tracker 22 based on the estimated direction Alike while the optical marker 21 is in the second position a2 the optical marker 21 is rotated such to point towards the optical tracker 22 based on the estimated direction.

The invention claimed is:

1. A method of operating a mobile construction robot which is configured for machining or finishing an architectural construction site, comprising the steps of:
   placing an optical tracker on the architectural construction site;
   parking a driving platform of the mobile construction robot in an area of the architectural construction site;
   moving an end effector of the mobile construction robot in a first position and a second position by controlling a robotic arm mounted on the driving platform;
   measuring the first position and the second position of the end effector relative to the driving platform using a sensor mounted on the robotic arm;
   tracking an optical marker mounted to the end effector in the first position and the second position of the end effector with the optical tracker and measuring the first position and the second position of the optical marker relative to the optical tracker with the optical tracker; and
   determining a position and an orientation of the driving platform based on the measured first position and the second position of the end effector relative to the driving platform and the measured first position and the second position of the optical marker relative to the optical tracker.

2. A mobile construction robot which is configured for machining or finishing an architectural construction site, comprising:
   a driving platform;
   a driving control unit, wherein the driving control unit controls movement of the driving platform over a ground of the architectural construction site;
   a robotic arm mounted onto the driving platform, wherein the robotic arm includes a rotational joint which has a rotary drive and a rotary sensor;
   an end effector mounted to the robotic arm for machining or finishing the architectural construction site;
   a robot control unit, wherein the robot control unit interacts with the rotational joint for moving the end effector in a first position and a second position;
   an optical marker attached to the end effector;
   an optical tracker, wherein the first position and the second position of the optical marker relative to the optical tracker is measurable by the optical tracker; and
   a calibration unit, wherein a position and an orientation of the driving platform is determinable by the calibration unit based on a measured first position and second position of the end effector relative to the driving platform and a measured first position and second position of the optical marker relative to the optical tracker.

* * * * *